April 30, 1957

D. D. GRIMES ET AL 2,790,322

DEVICE FOR MEASURING THRUST FORCES
DEVELOPED BY ROCKET MOTORS

Filed Oct. 4, 1954

INVENTORS
LOWELL W. BENNETT
DAVID D. GRIMES
BY
ATTORNEYS

April 30, 1957

D. D. GRIMES ET AL 2,790,322

DEVICE FOR MEASURING THRUST FORCES
DEVELOPED BY ROCKET MOTORS

Filed Oct. 4, 1954

INVENTORS
LOWELL W. BENNETT
BY DAVID D. GRIMES

ATTORNEYS

United States Patent Office 2,790,322
Patented Apr. 30, 1957

2,790,322

DEVICE FOR MEASURING THRUST FORCES DEVELOPED BY ROCKET MOTORS

David D. Grimes, Silver Spring, and Lowell W. Bennett, Derwood, Md., assignors to the United States of America as represented by the Secretary of the Navy Application October 4, 1954, Serial No. 460,289

5 Claims. (Cl. 73—116)

This invention relates generally to thrust measuring devices, and more particularly to an arrangement for determining the magnitudes of thrust forces developed by rocket motors.

In the design and development of aerial missiles, it is necessary to determine the magnitudes of the thrust developed by rockets utilizing different propellants at the end of certain time intervals. To achieve this, tests are run in which the rockets or scale models thereof utilizing the different specific propellants are mounted on a suitable thrust measuring device and ignited. A continuous record is made of the thrust developed as the propellant burns. This curve contains information that is used in the design and evaluation of rockets and aerial missiles.

Accordingly, a principal object of this invention is to provide an improved thrust measuring device that will provide a determination of thrust as a function of time.

It is another object of this invention to provide an arrangement for determining the magnitudes of thrusts developed by rocket motors.

Another object of this invention is to provide apparatus for quickly and accurately measuring thrust forces developed by rocket motors while in operation on a test stand.

Still another object of the invention is to provide thrust measuring apparatus that is economical to manufacture, easy to install and maintain, and which is efficient and reliable in operation.

Other objects and many of the attendant advantages of this invention will be readily appreciated as the same becomes better understood by reference to the following detailed description when considered in connection with the accompanying drawings wherein.

In accordance with the invention, apparatus is provided for measuring thrust forces developed by a rocket motor. This apparatus includes a base plate, together with means which are mounted on the base plate for supporting the rocket motor and for maintaining the rocket motor substantially parallel to the base plate during burning of the propellant therein. Additional means are provided for indicating deflections of a transducer when the rocket motor is burning. The deflections can be converted into force or thrust indications by suitable means and then recorded for permanent record.

Figure 1:
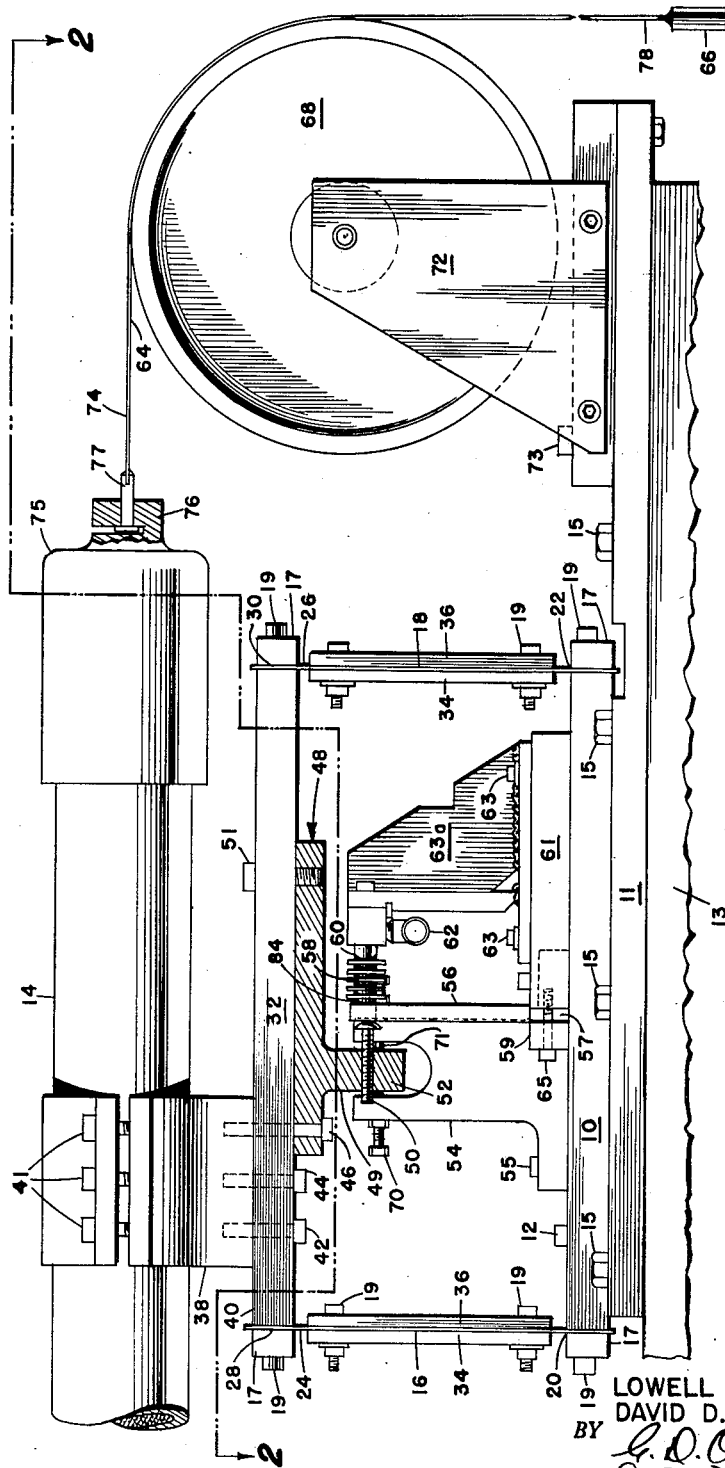
Fig. 1 is a side view of the thrust measuring apparatus, including an additional arrangement for obtaining a thrust calibration curve of a rocket motor.
Figure 2:
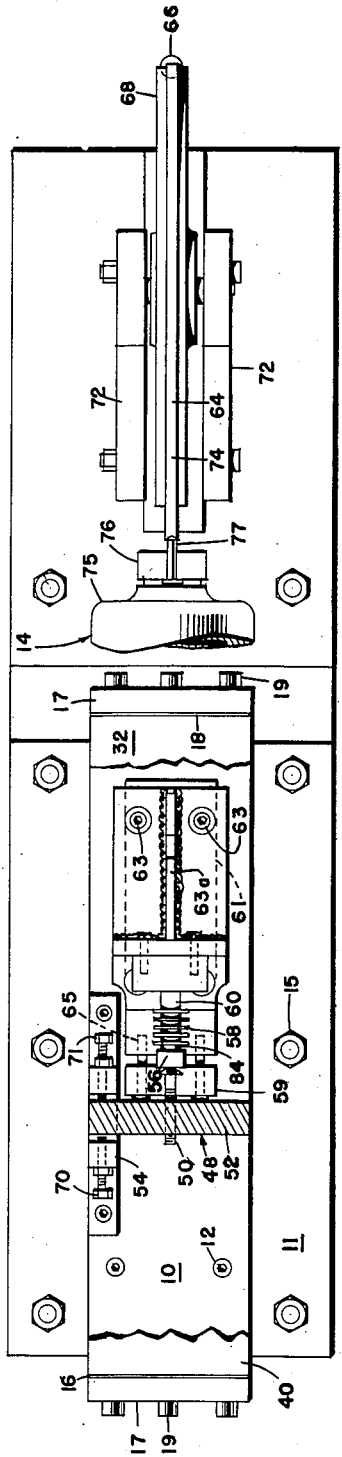
Fig. 2 is a top view of the arrangement in Fig. 1.

Referring now to Figs. 1 and 2, there is shown apparatus for determining thrust forces developed by a rocket motor 14 and the like. This apparatus includes a fixed plate 10 mounted on a base plate 11 by suitable means, such as bolts 12. Plate 11, in turn, is mounted on a suitable foundation 13 by bolts 15.

Two parallel leaf springs 16 and 18 are hinged to plate 10 at points 20 and 22. The other ends 24 and 26 of these leaf springs 16 and 18 are hinged at points 28 and 30, respectively, to a top plate 32, which is parallel to plate 10. These springs 16 and 18 are secured to plates 10 and 32 by transverse bars 17, of the same width as the springs 16 and 18, and a plurality of bolts 19. Stiffening plates 34 and 36 are fastened to leaf springs 16 and 18 by bolts 19. Leaf springs are used instead of conventional hinges in order to eliminate friction and hysteresis in the arrangement.

A clamping member 38 is supported near one end 40 of top plate 32. It is arranged to be adjusted by means of bolts 42, 44, and 46. Rocket motor 14, in turn, is supported in the clamp member 38 and is maintained in position by bolts 41. Rocket motor 14 is positioned so that its longitudinal axis is placed parallel to bottom plate 10 and top plate 32.

A T plate 48 is mounted below top plate 32, with the foot portion 49 thereof being arranged vertically. Plate 48 is secured to plate 32 by bolts 46 and 51. A positioning screw 50 passes through the foot portion 49 of T plate 48. This screw 50 can be adjusted to position a cantilever beam or spring 56, which has its fixed end 57 located between a horizontal bar member 59 and a plate 61 which is secured on base plate 10 by bolts 63. Bolts 65 secure the end 57 of cantilever 56 in position by engaging the plate 61. The free end of the cantilever beam 56 engages one end of a transducer 58. The other end 60 of the transducer 58 having an outlet 62 is connected to an indicating gage or to a recording device located at a remote point. Transducer 58 can be mounted on a bracket 63a, which, in turn, is mounted on base plate 61. Electrical motion transducers of either the capacitive or inductive types can be used in place of the mechanical transducer 58. Also, electric strain gages, in a proper electric circuit, could be mounted on the cantilever beam 56. These could be used in conjunction with the transducer 58, or could replace the transducer.

A bracket or flange member 54, which is secured to plate 10 by bolts 55, can be used to limit the motion of plates 32 and 48 by means of suitable stops such as adjustable screws 70 and 71 which limit the motion of the foot portion 49 of plate 48.

In order to obtain a calibration curve of force representing thrust versus deflection, a spring steel tape 64 is utilized in conjunction with weights placed on a holder 66 and a pulley wheel 68, which is mounted on plate 11 near one end thereof by means of vertical plate members 72. One end 74 of tape 64 is secured to a headed pin 77 which is inserted in a slotted boss 76 on end 75 of rocket motor 14. Tape 64 passes over the pulley wheel 68, and at its other end 78 weights are placed on holder 66 for calibration purposes. Plate members 72 can be mounted on plate 11 by bolts 73.

Figure 3:
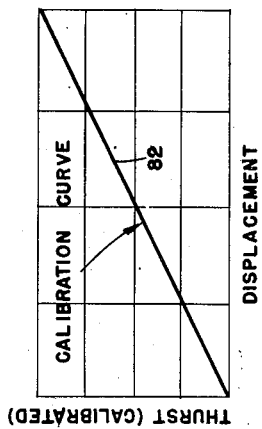
Fig. 3 is a calibration curve of thrust versus displacement.

Prior to determining the actual curve of thrust as a function of time for rocket motor 14, a calibration curve of thrust is first obtained. A typical calibration curve 82 is shown in Fig. 3. Curve 82 is obtained by setting positioning screw 50 so that it is in contact with end 84 of transducer 58 without displacing the transducer 58. Weights are then added to weight holder 66, and readings are then recorded by suitable recording means of calibrated thrust as a function of displacement of the transducer 58.

Figure 4:
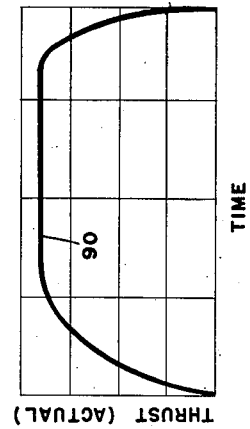
Fig. 4 is a curve of actual thrust developed by a rocket motor versus time.

Tape 64 is then disconnected from rocket motor 14, and the rocket motor is fired to obtain an actual thrust curve 90 as a function of time as shown in Fig. 4. This is accomplished by movement of plates 32 and 48, which, in turn, move screw 50 to displace the upper and free end of the cantilever beam 56. Upon displacement of the cantilever beam 56, the transducer 58 is displaced to pressurize the fluid therein, and this pressure is transmitted and recorded at a remote point by the recording means. Thus, when rocket motor 14 is ignited, the positioning screw 50 presses against transducer 58, with pressure (thrust) readings as a function of time being recorded on a film.

By use of the calibration curve 82, it is possible to scale off the actual value of thrust from curve 90 as a function of time. This information is subsequently used for design purposes.

Obviously many modifications and variations of the present invention are possible in the light of the above teachings. It is therefore to be understood that within the scope of the appended claims the invention may be practiced otherwise than as specifically described.

What is claimed is:

1. A device for measuring the thrust forces developed by a rocket motor, comprising a base plate, a top plate, at least two parallel spaced spring elements of equal length extending vertically from said base plate for supporting said top plate and for maintaining said top plate substantially parallel to said base plate, means for securing said rocket motor to said top plate, and means for sensing the displacement of said rocket motor during burning of said rocket motor.

2. A device for measuring the thrust forces developed by a rocket motor during burning thereof, comprising, a deformable parallelogram structure for supporting said rocket motor, said structure including a first plate having means for securing said motor thereto, a second plate, a pair of legs of equal length, said legs each being flexibly jointed at one end to said first plate and flexibly jointed to said second plate at the opposite end, the distance between said joints on said first plate being equal to the distance between said joints on said second plate, spring means mounted on one of said plates and bearing on the other of said plates for resisting deformation of said parallelogram structure, and means on one of said plates for sensing displacement of said first plate relative to said second plate.

3. A device for measuring the thrust forces developed by a rocket motor during burning thereof, comprising, a deformable parallelogram structure for supporting said rocket motor, said structure including a first plate having means for securing said motor thereto, a second plate, a pair of parallel flexible legs of equal length secured perpendicularly to said first plate and to said second plate and maintaining said first and second plates in parallel relationship upon displacement of said first plate with respect to said second plate, spring means mounted on one of said plates and bearing on the other of said plates for resisting deformation of said parallelogram, and means on one of said plates for sensing displacement of said first plate relative to said second plate.

4. A device for measuring the thrust forces developed by a rocket motor, comprising a parallelogram structure for supporting said motor during burning, said structure including a top plate having means for securing said motor thereto, a base plate, a pair of leaf springs securing said top plate to said base plate, said springs being of equal length and depending perpendicularly from said top plate in their unflexed state, a cantilever beam secured to one of said plates with its free end bearing on the other of said plates to resist displacement of said top plate relative to said bottom plate, and means on one of said plates for sensing displacement of said top plate relative to said bottom plate.

5. A device for measuring the thrust forces developed by a rocket motor, comprising a base plate, a pair of parallel leaf springs mounted vertically upon said base plate, a top plate having means for mounting said motor, said top plate being secured to said springs in parallel relationship with said base plate, means fixed to said base plate and bearing on said top plate for opposing motion of said top plate with respect to said bottom plate, and means on one of said plates for sensing displacement of said top plate with respect to said bottom plate.

References Cited in the file of this patent

UNITED STATES PATENTS

| | | |
|---|---|---|
| 2,252,464 | Kearns et al. | Aug. 12, 1941 |
| 2,362,308 | Roberts | Nov. 7, 1944 |
| 2,446,537 | Hickman | Aug. 10, 1948 |
| 2,498,995 | Manning | Feb. 28, 1950 |
| 2,657,574 | Whitehead | Nov. 3, 1953 |
| 2,680,373 | Bechberger | June 8, 1954 |
| 2,681,566 | Ruge | June 22, 1954 |